May 19, 1925. 1,538,774
J. WINKLER
CLUTCH LEVER CONTROL
Filed Nov. 23, 1923
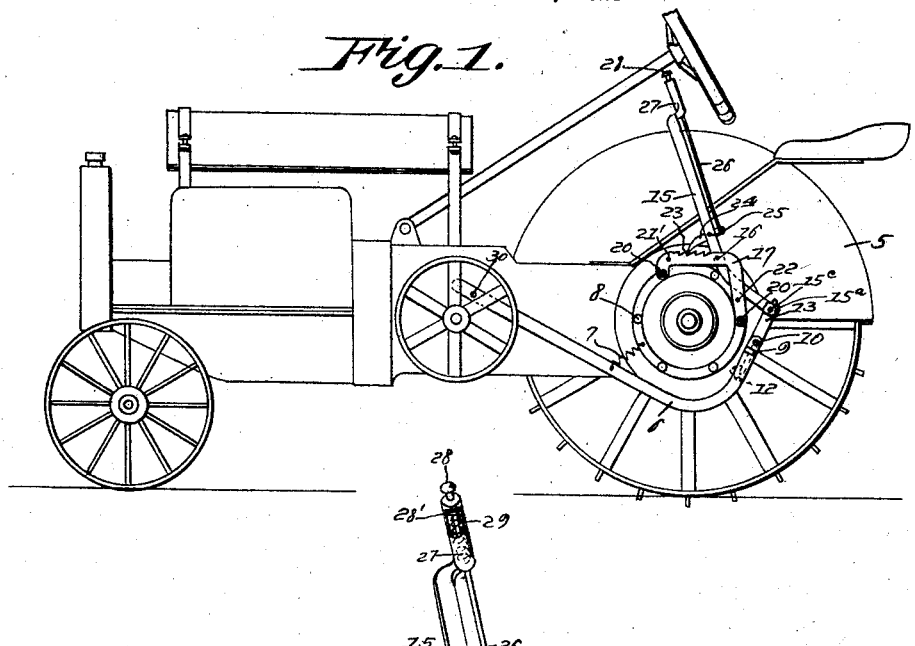
Fig. 1.
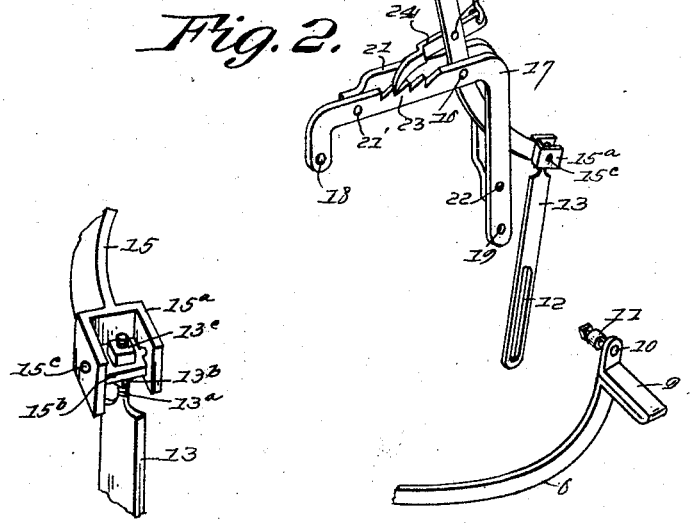
Fig. 2.
Fig. 3.
Inventor
Joseph Winkler
By Frank S. Appleman
Attorney Patented May 19, 1925.

1,538,774

UNITED STATES PATENT OFFICE.

JOSEPH WINKLER, OF ELKADER, IOWA.

CLUTCH-LEVER CONTROL.

Application filed November 23, 1923. Serial No. 676,599.

*To all whom it may concern:*

Be it known that I, JOSEPH WINKLER, a citizen of the United States of America, and resident of Elkader, in the county of Clayton and State of Iowa, have invented certain new and useful Improvements in Clutch-Lever Controls, of which the following is a specification.

This invention relates to clutch controlling devices for use in tractors, and the said invention has for an object the provision of novel means for holding a clutch operating lever, and also means for manipulating the said lever;. and furthermore, the invention includes novel means whereby the clutch lever may be operated independently of the aforesaid operating and holding means.

This invention is primarily intended for use in connection with a well known make of tractor, but it may be likewise employed in connection with tractors of other makes.

The invention has for an object to provide an extremely simple clutch pedal lock and release, the same being capable of being mounted on a tractor within easy and convenient reach of an operator occupying the seat of the tractor.

With the foregoing and other objects in view, the invention consists in the details of construction, and in the arrangement and combination of parts to be hereinafter more fully set forth and claimed.

In describing the invention in detail, reference will be had to the accompanying drawings forming part of this application wherein like characters denote corresponding parts in the several views, and in which—

Figure 1 illustrates a view in elevation of a tractor with a device embodying the invention applied thereto; and Figure 2 illustrates a perspective view of the device, one part of which is detached from the other.

Fig. 3 is a detail view of a joint between a hand lever and a link used in the device.

In these drawings, 5 denotes a tractor which is conventionally shown and the details of construction thereof are immaterial.

The clutch operating lever 6, in this embodiment of the invention, is held normally in the position shown in Fig. 1 by the action of a spring 7 which extends from the lever 6 to an anchorage 8 which may be on the housing or casing of the tractor. The lever 6 has a pedal 9 and a stud 10 projects from the said lever in a direction opposite to the pedal, and the said stud has an anti-friction roller 11 applied to it. The anti-friction roller operates in a slot 12 formed in a link 13 and disassociation of the link and the roller is prevented by any suitable fastening 14, such as a nut or the like. The link has its upper or inner end pivotally connected to a lever 15, as will presently appear, and the lever is oscillatably mounted on a pivot 16 carried by a bracket 17, the bracket being, in the present embodiment of the invention, of approximately triangular outline, and having apertures 18 and 19 in its ends to receive fastenings 20 such as bolts or the like, by which the said bracket is anchored to the casing or housing of the tractor.

The bracket element 17 is also attached to an angularly disposed plate 21 shorter than the bracket, but of the same general contour as to its angle, and the said plate has its ends secured to the bracket at 21 and 22, the said plate being in spaced relation to the bracket to form a clearance in which the lever 15 may oscillate. The bracket has a series of teeth 23 which serve to engage a detent 24 for holding the lever 15 at different positions of adjustment. The detent is in the nature of a dog and it is mounted on a pivot 25 carried by the lever 15.

One end of the dog is connected to a rod 26 which is guided in a tubular portion of a handle 27 at the upper or outer end of the lever 15, and the said rod terminates in a knob or thumb piece 28 which may be pressed by an operator. A spring 29 is seated within the handle and it bears against the handle and against the knob or thumb piece 28 to exert pressure on the rod to hold it normally upward, the tension of the spring being exerted to hold the detent normally in engagement with the teeth 23. As the spring 7 serves to pull the lever 6 upwardly, the anti-friction roller 11 is maintained, under normal conditions, at the upper end of the slot 12 of the link. If desired, an operator may apply power to the pedal 9 and force the clutch lever downwardly independently of the link, or the clutch lever may be forced downwardly by the operation of the lever 15.

The clutch lever may have its forward end connected to a shaft or other device 30 connected to the clutch operating mechanism, but this is also a detail of construction which may be changed to suit particular requirements, and the inventor does not wish to be limited in this respect.

The link 13 has its upper end reduced and threaded as at 13ª and this reduced end extends through a plate 15ᵇ where it is held in place by nuts 13ᵇ and 13ᶜ. The plate 15ᵇ has trunnions 16ᶜ which are partially rotatable in the ears 15ª carried by the lever 15.

The construction and operation will, it is thought, be understood from the foregoing description and the advantages will likewise, it is thought, be apparent to those skilled in the art.

I claim:

In a clutch lever control, a clutch lever, means for holding the clutch lever normally elevated at its outer end, an anti-friction roller on the clutch lever, a link having a slot to receive the anti-friction roller, a lever having ears, a plate trunnioned on the ears and having an aperture to receive the end of the link, means for securing the link to the plate, and means for holding the lever at different positions of adjustment.

JOSEPH WINKLER.